United States Patent
Chan (10) Patent No.: US 10,176,686 B2
(45) Date of Patent: Jan. 8, 2019

(54) SYSTEM OF LIVING

(71) Applicant: Mark Kit Jiun Chan, China (CN)

(72) Inventor: Mark Kit Jiun Chan, China (CN)

(*) Notice: Subject to any disclaimer, the term of this patent is extended or adjusted under 35 U.S.C. 154(b) by 0 days.

(21) Appl. No.: 14/616,852

(22) Filed: Feb. 9, 2015

(65) Prior Publication Data

US 2016/0035196 A1    Feb. 4, 2016

Related U.S. Application Data

(60) Provisional application No. 61/937,661, filed on Feb. 10, 2014.

(51) Int. Cl.
| | | |
|---|---|---|
| H04M 1/68 | (2006.01) | |
| G08B 13/22 | (2006.01) | |
| H04W 4/02 | (2018.01) | |
| H04W 4/04 | (2009.01) | |
| H04W 68/00 | (2009.01) | |
| G08B 21/22 | (2006.01) | |
| H04L 29/06 | (2006.01) | |
| H04W 4/021 | (2018.01) | |
| H04W 12/08 | (2009.01) | |
| H04L 29/08 | (2006.01) | |
| H04W 4/029 | (2018.01) | |
| G08B 13/00 | (2006.01) | |
| G08B 25/00 | (2006.01) | |
| G08B 25/14 | (2006.01) | |
| G08B 29/18 | (2006.01) | |
| G07C 9/00 | (2006.01) | |
| H04W 4/70 | (2018.01) | |

(52) U.S. Cl.
CPC .............. *G08B 13/22* (2013.01); *G07C 9/00* (2013.01); *G07C 9/00111* (2013.01); *G08B 13/00* (2013.01); *G08B 21/22* (2013.01); *G08B 25/008* (2013.01); *G08B 25/14* (2013.01); *G08B 29/188* (2013.01); *H04L 63/107* (2013.01); *H04L 67/12* (2013.01); *H04W 4/02* (2013.01); *H04W 4/021* (2013.01); *H04W 4/029* (2018.02); *H04W 4/043* (2013.01); *H04W 12/08* (2013.01); *H04W 68/005* (2013.01); *H04W 4/70* (2018.02)

(58) Field of Classification Search
CPC .... G08B 13/22; H04W 4/043; H04W 68/005; H04W 4/028; H04W 4/02; H04W 4/005
USPC ......................................................... 455/411
See application file for complete search history.

(56) References Cited

U.S. PATENT DOCUMENTS

2012/0105229 A1* 5/2012 Kates ................... G08B 13/183
340/541

FOREIGN PATENT DOCUMENTS

GB        2470901 A  * 12/2010 ............. G06Q 10/00

* cited by examiner

*Primary Examiner* — Amancio Gonzalez
(74) *Attorney, Agent, or Firm* — JMB Davis Ben-David (57) ABSTRACT

A system and method used for monitoring conditions in a space through characterizing detected occupants with properties in accordance with time, location and tracked traversal path. The intruder as a detected occupant is distinguished from the tenant, property management staff, and visitor. The system triggers an alert indicative of a condition by sending signals and messages to selected devices or systems as receiving nodes. A condition, such as collected sensor data incompliant to a threshold, is detected and an alert is triggered. A user carried mobile device such as the cellular phone, elevator control system operative in a building are possible receiving nodes of a triggered alert for a detected condition.

20 Claims, 6 Drawing Sheets

SYSTEM OF LIVING

TECHNICAL FIELD

The present invention relates to a system and methods to respond to monitored conditions in a living space ("space") as a unitary and independent complex: a tenant unit, a building. The related users may be the tenant, management staff, visitor, intruder. The tenant is identified through an identification entity with short-range wireless communicative capacities; or a user carried mobile device ("user mobility")—such as digital cellular systems, personal communications systems ("PCS"), enhanced specialized mobile radios ("ESMRs"), radio frequency ("RF") based tracking systems (Bluetooth, WiFi, ZigBee). A digital device ("staff digital device") is carried by management staff servicing a user's space: a house, a building. A processing system processes signals/data received from at least one: monitoring device, user mobile device, staff digital device and a plurality of beacons.

BACKGROUND ART

A space typically undergoes dynamic daily residing tenant ("user as inhabitant") activities, comprising departing, returning and staying within. Other users of the environment include management staff and visitors. Prevention of intruders trespassing entails user activated alarm system, closed-circuit television ("CCTV") monitoring and patrolling by management staff.

SUMMARY OF INVENTION

The present disclosure relates to methods that generate and send signals/data when a detected condition is beyond a state level; under some conditions, alerts are sent to selected receiving nodes upon detection of occupancy, also, the system correspondingly limits elevator use.

Technical Problem

Monitoring systems are mostly related to alarm systems, which commonly have unresolved problems with false alarms triggered by animals and heedless users. In converse, the alarm is dependent on user activation and is otherwise unreactive to actual intrusion. The CCTV is incapable of alerting property management staff with possible security incidents—it is commonly for recording. The outcome is ineffective assurance of alert sending prior to and during intrusion of a space. An intruder also conveniently uses the elevator and endangers safety of tenants in different building territories. What remains an unresolved problem is to have in place a system to ensure sheer authorized entry into the monitored space without triggering false alarms.

The space inhabitant needs some conditions within a space at a "comfortable" state. Selected systems allow data display on the user's mobility: adjustment of those conditions demand manual input. It would be ideal to automate adjustment of those monitored conditions.

DESCRIPTION OF THE INVENTION

Solution to Problem

The present invention provides a system and methods to monitor conditions in a space, respond when a condition is detected. One condition is detected intrusion, whereas a system response is to trigger an alert. Another exemplary condition is indoor temperature, the system response allows automated regulation at an intended state through a state system.

To counter connectivity disablement, the system encompasses a pulser to send signals/data to the cloud based processing system in accordance with a preconfigured address and frequency. When signal disruption from the system in the space to the processing system occurs, the processing system determines to alert designated parties. The system alert is through the send of messages upon or prior to an incident of possible intrusion and trespassing to selected devices, including the user mobility and client computer.

The system has a learning capability to project the arrival time of user as inhabitant at the space; when the user mobility is at other locations, questions are prompted for understanding those locations. The system will exclude the possibility of false alarm if projected user arrival time is beyond the concurrent time of occupancy detection during an activated alarm operation. The operation also involves preventing the detected intruder from using the elevator for escape.

Advantageous Effects of Invention

Monitoring of the space entails identification of the occupancy status within and the environment around it. The invention involves automated activation and deactivation of an alarm operation—commonplace systems require manual input.

The space conditions are monitored through a slew of sensors, encompassing camera (for video), microphone (for audio), passive infrared sensor (to detect motion), and climate sensors, such as carbon monoxide sensor, temperature sensor, humidity sensor and others. Contemporaneous signals/data are collected by a monitoring device ("gateway") for processing with the processing unit; or sent for processing to a cloud-based processing system, comprising an application server and memory with a database.

The conditions of a monitored space may be maintained at a desired state through sending gateway output, as well as, processing system output, comprising signals/data to other devices or systems.

BRIEF DESCRIPTION OF DRAWINGS

The drawings constitute to embodiments of the present invention and serve to depict the apparatuses infrastructure and operating principles.

DESCRIPTION OF EMBODIMENT

Exemplary embodiments of the invention are discussed in detail below. While specific exemplary embodiments are discussed, it should be understood that they serve illustration purposes only.

Time and Location Based Monitoring and Alarm Operation

Figure 1:
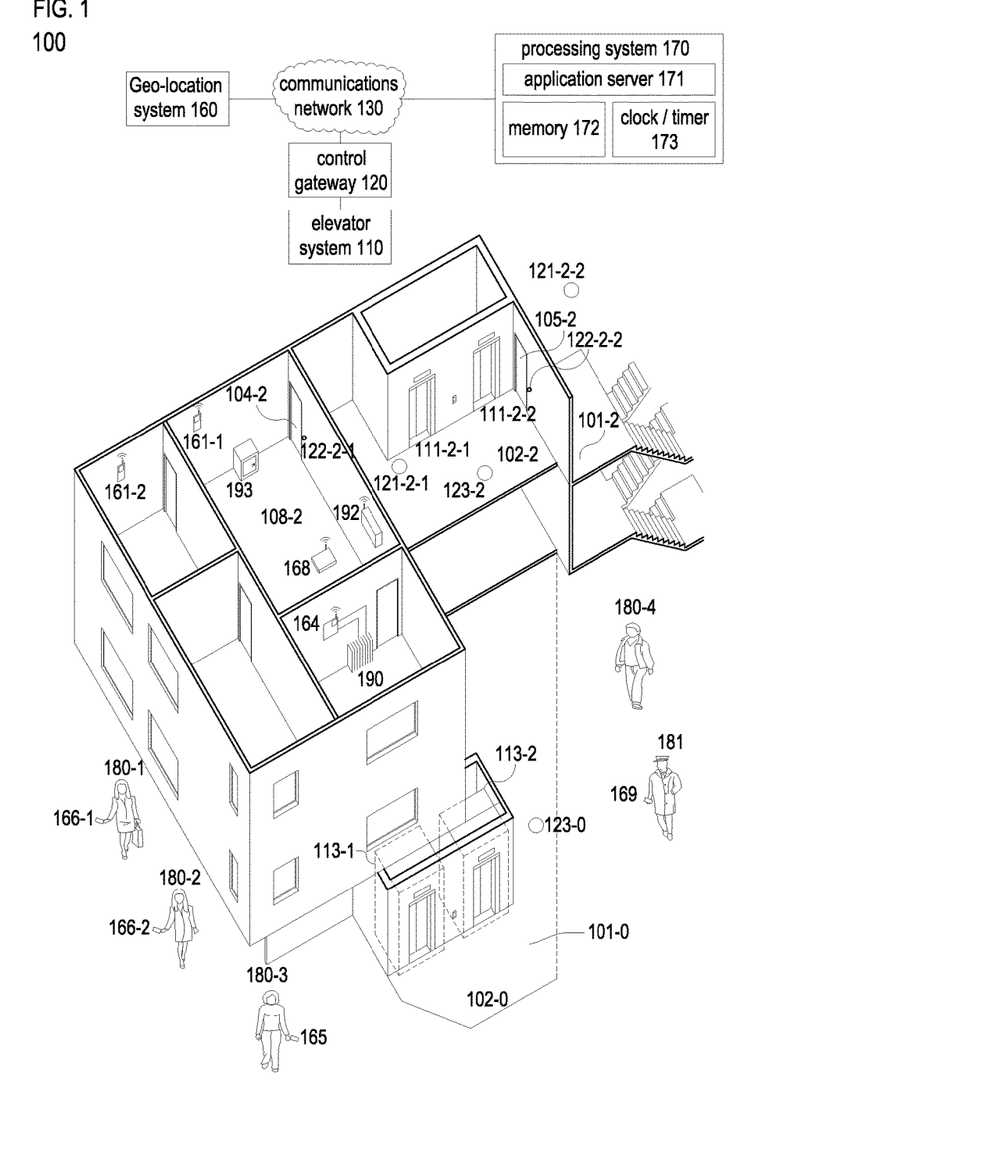
FIG. 1 depicts a building under surveillance of the system.

As depicted in FIG. 1, building 100 is installed with elevator system 110, elevator cars 113-1 and 113-2 commute between ground floor level 101-0 and a plurality of floor levels 101—including floor level 101-2. Elevator doors 112-2-1 and 112-2-2 are disposed at floor level 101-2.

Gateway 168 is configured to receive signals/data transmitted by a plurality of encompassed sensors, including: occupancy sensors 161-1 and 161-2 occupancy detection within unit 108-2; slave 164 feedback signals/data correspond to connected state system 190 on/off mode; and from communicatively connected devices, including: door sensor 122-2-1 detecting door 104-2 opening/closing; home device 192 as an air conditioner feedback signals/data correspond to on/off operative mode; external device 193 as a safe detecting opening/closing. Said signals/data are received by gateway 168 and transported to processing system 170—encompassing application server 171 and memory 172—via communications network 130.

Control gateway 120 is configured to receive information comprising signals/data transmitted by a plurality of communicatively connected systems and devices, including: elevator system 110, floor level 101-2 installed occupancy sensors 121-2-1 and 121-2-2, door sensors 122-2-1 and 122-2-2, beacon 123-2, as well as, beacon 123-0 installed at floor level 101-0. In another set up procedure, gateway 168 and control gateway 120 comprise a wireless router, allowing direct connection to mobility 166. In this example, gateway 168 or control gateway 120 sends an IP address to mobility 166; user 180 enters their WiFi SSID and password via the App to connect to gateway 168 or control gateway 120. A secure cryptographic key may be issued to enable secured pairing; Bluetooth pairing, direct USB connection, or DTMF may also be used to configure mobility 166.

In embodiment one, users as inhabitants 180-1 and 180-3 carrying mobility 166-1 and identification entity 165, respectively, step out of monitored unit 108-2—triggering door sensor 122-2-1 to send a signal upon door 104-2 opening, and occupancy sensor 121-2-1 to send a signal upon detecting occupancy in waiting lobby 102-2. Through prompting a message gateway 168 requests a response message from user as inhabitant 180-1 mobility 166-1: gateway 168 does not receives a user as inhabitant 180-1 mobility 166-1 sent short-range wireless response message. Upon the lapse of a time period, which exceeds a preconfigured first threshold, processing system 170 ascertains a deactivated alarm operation and activates an alarm operation pertaining to unit 108-2. In furtherance, gateway 168 sends a wired/wireless signal upon activation of the alarm operation, wherein slave 164 is a relay comprising a unique identifier and a communication component (not shown) receiving the gateway 168 sent wired/wireless signal and switches off state system 190. During an activated alarm operation, given occupancy sensors 161-1 or 161-2 detect occupancy, while a response message from mobility 166-1 is not received by gateway 168, processing system 170 will trigger an alert and send a message to user as inhabitant 180-1 mobility 166-1 and staff 181 digital device 169.

In embodiment two, user as inhabitant 180-3 carrying identification entity 165 steps out of unit 108-2, while user as inhabitant 180-1 carrying mobility 166-1 stays: user as inhabitant 180-1 mobility 166-1 sends a short-range wireless message within a time period of the preconfigured first threshold in response to gateway 168 prompted quest message: an alarm operation pertaining to unit 108-2 is not activated.

Time Based Path Surveillance

Figure 2:
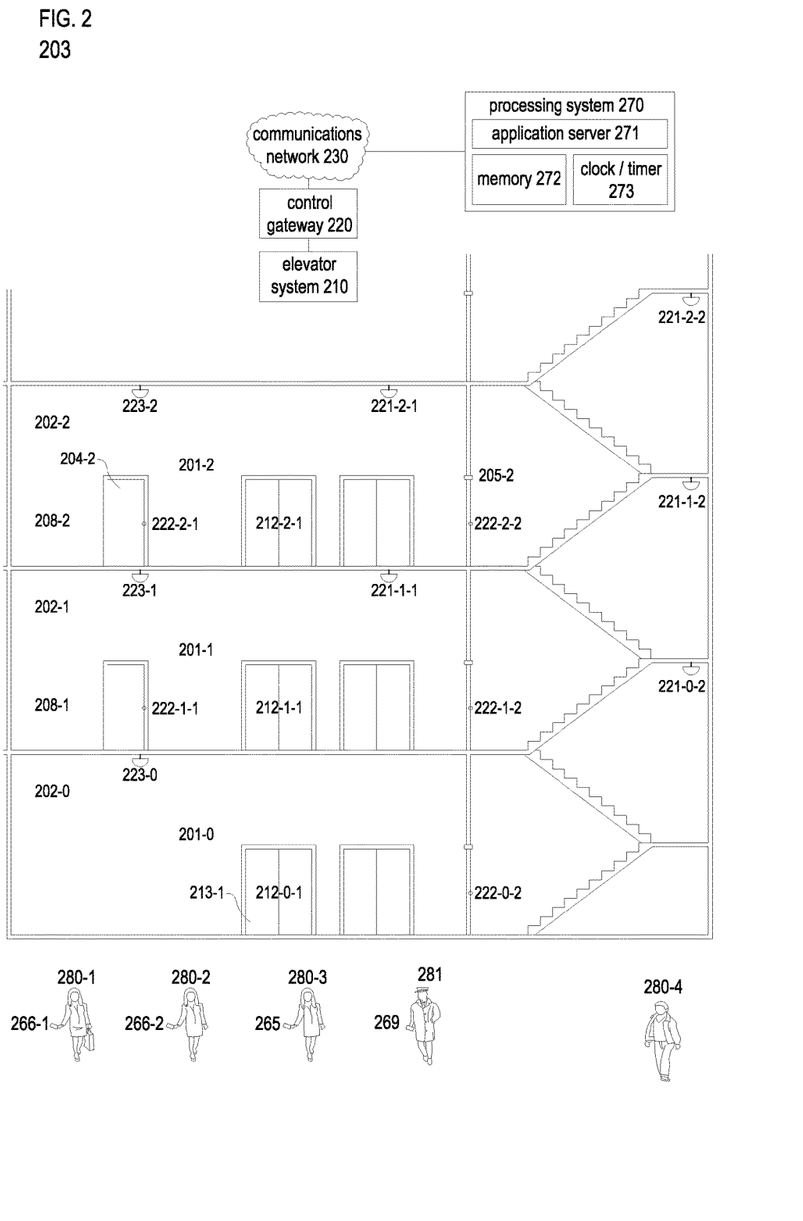
FIG. 2 depicts the system triggering an alert for send to targeted users in an alarm operation within a building.

FIG. 2 illustrates one aspect of a building as location 203: control gateway 220 is communicatively connected with a plurality of occupancy sensors 221, door sensors 222, beacons 223, as well as, elevator system 210—installed and operative within location 203. Each point of detected occupancy constitutes to tracked user traversal path with respect to time ("clock time") adopted by cloud service node located processing system 270.

In embodiment three, user 280-4 as trespasser lingering in waiting lobby 202-1 for a time period exceeding a preconfigured second threshold is detected by occupancy sensor 221-2-1. Processing system 270 sends an alert to the receiving nodes, comprising: a text message to staff 281 digital device 269 requesting staff 281 to respond to the message and visit waiting lobby 202-1 within a preconfigured time period; and, a text message informing a potential incident to mobility 266-1 carried by user 280-1 as sole inhabitant of unit 208-1; as well as, an alert signal to elevator system 210, which receives the alert signal, evades landing elevator cars on floor level 201-1 and opening elevator doors 212-2-1 within a preconfigured time period. Staff 281 digital device 269 is configured to send the pairing records to processing system 270 upon the lapse of the time period of a received alert, which do not include pairing between digital device 269 and beacon 223-1: processing system 270 sends an alert to a receiving node, comprising a building administrator client computer (not shown).

In embodiment four, user 280-4 as trespasser arriving at waiting lobby 202-0 and traversing through stairs territories at floor levels 201-0, 201-1, and 201-2—is sequentially detected by occupancy sensors 221-0-2, 221-1-2, and 221-2-2. User 280-4 opens emergency door 205-2—triggering door sensor 222-2-2 to transmit a signal at time $t_0$, and is detected by occupancy sensor 221-2-1 at time $t_1$ when entering waiting lobby 201-2. On the other hand, user 280-1 as inhabitant of unit 208-2 enters waiting lobby 201-2 through elevator doors 212-2-1 imminently before time $t_0$. Users 280-1 and 280-4 traverse toward normally closed door 204-2—door sensor 222-2-1 transmits a signal upon detecting opening at $t_2$. At $t_3$, door sensor 222-2-1 senses closing; whereas, occupancy sensor 221-2-1 detects non-occupancy. Processing system 270 receives the signals/data of two separate time based user traversal paths entering unit 208-2, and sends an alert to staff 281 digital device 269, as well as, user 280-1 mobility 266-1.

In embodiment five, staff 281 at the building entrance (not shown) is requested by the building administrator to visit unit 208-2 at time $t_4$. However, since time $t_4$ after a time period $\Delta t_v$, which exceeds a preconfigured third threshold (comprising a preconfigured travel time period stored in memory 272 characterized for door 204-2 corresponding to traveling from the building entrance to unit 208-2), processing system 270 received information pertaining to tracked traversal path of staff 281, comprising: (1) staff 281 digital device 269 pairing records not encompassing pairing with beacon 223-2 at floor level 201-2; (2) occupancy sensor 221-2-1 not detecting occupancy from control gateway 220; (3) door sensor 222-2-1 not detecting door 204-2 opening from control gateway 220. Processing system 270 sends an alert to a plurality of receiving nodes, including a building administrator client computer (not shown).

In embodiment six, information pertaining to a triggered alert on floor level 201-1 is sent by processing system 270 to elevator system 210; wherein, elevator system 210 receives said commanding message and evades floor landing and/or opening of elevator doors 212-1-1 on floor level 201-1.

Figure 3:
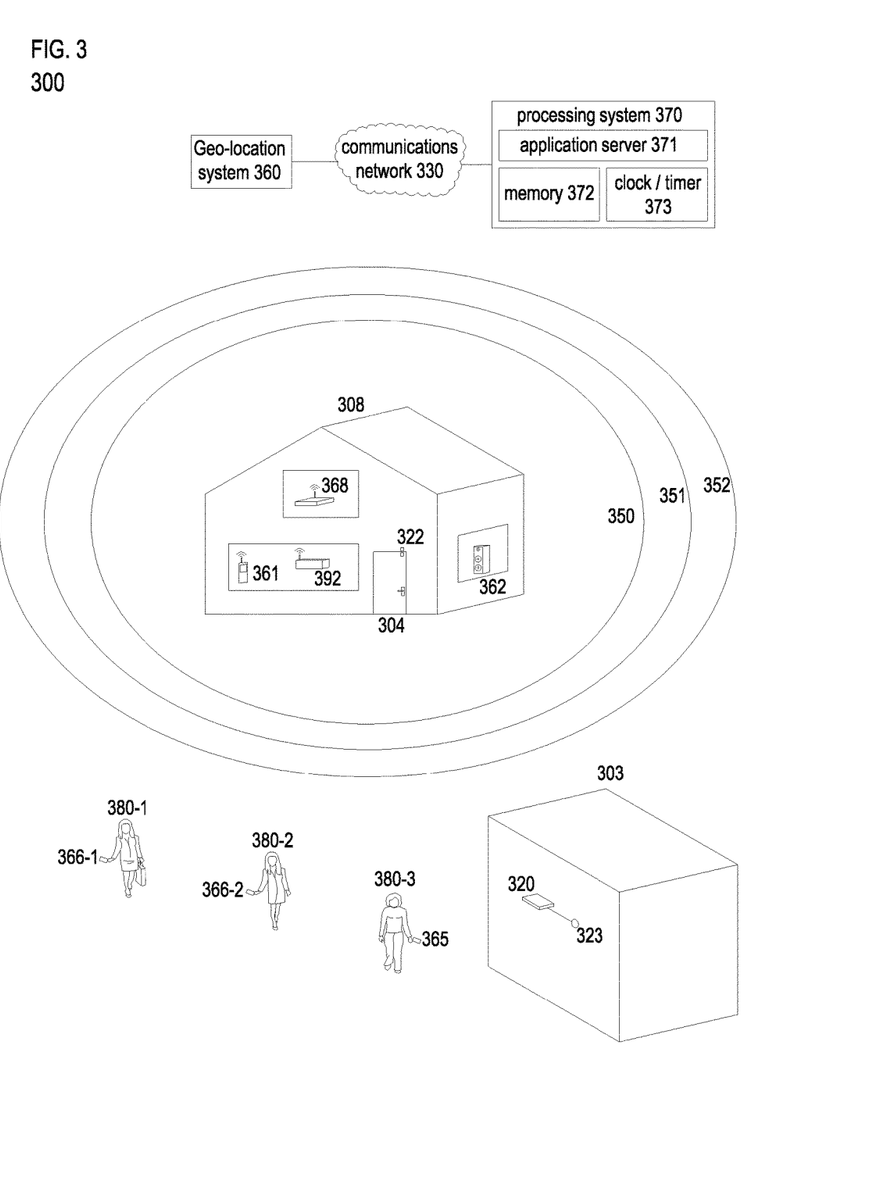
FIG. 3 depicts system correspondence with user at a distant location.

FIG. 3 presents an exemplary embodiment of environment 300—comprising the predefined circular geo-fence area 350, with a radius corresponding to the maximum offset between the computed center-of-mass being the monitored home 308 and the furthest edge of geo-fence boundary of geo-fence area 350. Control gateway 320 installed location 303 is outside geo-fence area 352.

In embodiment seven, mobility 366-2—carried by user 380-2 as sole inhabitant of home 308—periodically sends the concurrent geo-location, or Global Positioning System ("GPS") coordinates, to processing system 370 via communications network 330. At instantaneous time $t_1$, user 380-2 is within geo-fence area 352, at distance $d_1$ travelling away from home 308; at instantaneous time $t_2$, user 380-2 is within geo-fence area 351, at distance $d_2$ from home 308:

$$v = \frac{(d_2 - d_1)}{(t_2 - t_1)} \quad [1]$$

where, v is the directional velocity of user 380-2.
Arrival time $t_a$ of user 380-2 at home 308, is as follows:

$$t_a = t_c + \Delta t_a + \Delta t_f \quad [2]$$

where, $t_c$ is the concurrent time; whereas, lead time period $\Delta t_a$ can be projected, using:

$$\Delta t_a = \gamma \cdot \frac{d}{v} \quad [3]$$

where, γ represents a preconfigured factor pertinent to the uncertain preconditions affecting lead time period $\Delta t_a$, such as time of the day, the unique identifier of mobility 366-2 and characteristics of user 380-2 or home 308, etc. Other mathematic formulae, statistical analyses and methods may seem fit in different situations where appropriate and therefore can also be applied for projection of the arrival time $t_a$ of user 380-2 at home 308.

Mobility 366-2 carried by user 380-2 as inhabitant of home 308 arrives at location 303, user 380-2 mobility 366-2 establishes pairing with beacon 323 through finding and establishing a recognized wireless communication link; whereas, pairing disconnects when the communication link becomes out of range as user 380-2 departs from location 303. In one embodiment, user 380-2 mobility 366-2 adopts the processing system 370 clock/timer 374 clock time and sends the concurrent geo-location at location 303, pairing records—comprising clock time based data of pairing, pairing disconnection and beacon 323 unique identifier—to processing system 370 via communications network 330; as another possibility, processing system 370 receives the information from control gateway 320, or beacon 323. Processing system 370 stores the time span of stay of user 380-2 at location 303 in memory 372 with respect to clock/timer 374 clock time in according with the pairing records as: user 380-2 lead time duration $\Delta t_f$. Location 303 can be a building with an address, or a moving vehicle such as an automobile or an airplane having network communication capacity. A map may be applied by mobility 366-2 via an App to identify the geo-location of location 303.

Upon user 380-2 arriving at home 308, user 380-2 mobility 366-2 performs pairing with wireless router equipped gateway 368. Established pairing is recorded with respect to the clock time as user 380-2 arrival time $t_a$ at home 308 in the gateway 368 memory (not shown) and sent to processing system 370—which records user 380-2 arrival time $t_a$ in memory 372.

To continually reassure the accuracy of projecting user 380-2 arrival time $t_a$ at home 308, processing system 370 enacts an onboarding process for projection of user 380-2 lead time duration $\Delta t_f$ through prompting questions to learn about the relatedness between user 380-2 and location 303. After pairing with location 303 disposed beacon 323, user 380-2 mobility 366-2 may relate the control gateway 320 and/or beacon 323 unique identifier to exemplary questions, including:

What do you do here?

How long will you be here?

The address here?

Exemplary questions as shown may be presented through a mobility 366-2 App. As another possibility, mobility 366-2 prompts the query through an audio apparatus; user 380-2 may key in a text reply such as:

"I work here at 123 Queen's Road"

or, verbally provide an answer, which is processed using voice recognition technology. The processing may occur on mobility 366-2, and/or in a remote server coupled to mobility 366-2—for example, cloud located processing system 370 in a client-server architecture—after mobility 366-2 records and sends the reply via communications network 330.

Processing system 370 is programmed to derive at least one pattern to the characteristics of location 303 over a time period, comprising: location 303 address, geo-location, relationship with user 380-2, user 380-2 activity, typical/average user 380-2 lead time duration $\Delta t_f$, as well as, typical/average user 380-2 lead time period $\Delta t_a$ between departing from location 303 and arriving at home 308. Processing system 370 is also equipped with the processing components (hardware and software) with speed and data capacity to derive one or more patterns related to one or more characteristics of a plurality of locations 303 on basis of collected data from the corresponding beacons 323 and user provided answers sent by one or more mobilities 366.

Via an App, user 380-2 mobility 366-2 at location 303 establishes a statistical time log profile. The pairing records are as follows:

TABLE 1 pairing records pertinent to location 303

| Date | GPS coordinates | location 303 beacon 323 unique identifier/ time pairing/ time pairing disconnection | gateway 368 unique identifier/ time pairing |
|---|---|---|---|
| 2015 Jan. 3 | 45, 0 | f7126da6-4fa8/21:30 22:15 | bc50b27a/22:30 |
| 2015 Jan. 10 | 45, 0 | f7126da6-4fa8/21:25/22:10 | bc50b27a/22:25 |
| 2015 Jan. 17 | 45, 0 | f7126da6-4fa8/21:35/22:20 | bc50b27a/22:35 |

Given concurrent time $t_c$ is 21:28 on 2015-1-24, user 380-2 mobility 366-2 receives location 303 beacon 323 unique identifier "f7126da6-4fa8"; the App processes the data. User 380-2 mobility 366-2 sends to processing system 370 the phone serial number, and time log as follows:

TABLE 2 time log example

| | Address of location | GPS coordinates | $\Delta t_f$/(min) | $\Delta t_a$(min) | $t_a$ |
|---|---|---|---|---|---|
| time log | 123 Queen's Road | 45, 0 | 45 | 15 | 22:28 |

Alternatively, user 380-2 mobility 366-2 sends the data shown in Table 1 to processing system 370, which processes the data and obtains the time log, encompassing: (1) address of location 303; (2) user 380-2 geo-location; (3) lead time duration $\Delta t_f$ at location 303; (4) lead time period $\Delta t_a$; (5) projected user 380-2 arrival time $t_a$.

In embodiment eight, mobility 366-1—carried by user 380-1 as sole inhabitant of home 308 traverses beyond geo-fence area 350 and into geo-fence area 351—is configured to send its geo-location at a preconfigured frequency to processing system 370 via communications network 330. User 380-1 time log exceeds a preconfigured forth threshold, at the same time, visitor is not allowed in home 308 because a visit time period is not in effect: an alarm operation pertaining to home 308 is activated by processing system 370. Gateway 368 sends a wireless signal upon alarm operation activation and received by home device 392, wherein its operating mode is sustained in the off mode. In one possibility, home device 392 as air-conditioner remains deactivated; it is also possible that home device 392 is a door lock (not shown), which remains locked up and opening of door 304 is not possible. In contrary, once user 380-1 time log falls below the preconfigured forth threshold, processing system 370 sends a signal to gateway 368, which in turn sends a wireless signal to home device 392 as a door lock (not shown): it switches to a locked/unlocked state in which unlocking of it and opening of door 304 becomes possible.

In the event that gateway 368 collects sensor signals/data pertinent to occupancy sensor 361 detecting occupancy, or door sensor 322 detecting opening/closing of normally closed door 304: gateway 368 sends a signal to processing system 370, which immediately triggers an alert providing user 380-1 time log exceeds the preconfigured forth threshold and a concurrent visit time period is not in effect; alternatively, processing system 370 does not immediately trigger an alert providing user 380-1 time log is less than the preconfigured forth threshold or a concurrent visit time period is in effect—through prompting a message, gateway 368 requests a response message from user as inhabitant 380-1 mobility 366-1 or user as visitor 380-2 mobility 366-2. A short-range wireless response message will be sent by mobility 366-1 or mobility 366-2; failure of the response message receiving by gateway 368 within a time period of the preconfigured first threshold will result in satisfaction of set alert trigger condition—processing system 370 triggers an alert.

In embodiment nine, user as inhabitant 380-1 of home 308 establishes a visit time period, comprising: a starting date with one or more specific time periods in each of a span of days in accordance with the clock time; user 380-2 as authorized visitor ("visitor") carrying mobility 366-2, and user 380-3 as visitor carrying identification entity 365, are authorized to visit home 308 during the visit time periods. An alarm operation is normally activated for unattended home 308 during said days; in the event of occupancy sensor 361 in home 308 detecting occupancy, through prompting a message gateway 368 requests a response message from said user as inhabitant 380-1 mobility 366-1, and/or, user 380-2 as visitor mobility 366-2; wherein, user as inhabitant 380-1 mobility 366-1 time log is less than a preconfigured forth threshold.

Processing system 370 will not trigger an alert, comprising: (1) short-range wireless response message sent by mobility 366-1; (2) short-range wireless response message sent by mobility 366-2, or identification entity 365, wherein the clock time is within a visit time period. Home 308 monitoring gateway 368 receives and transports to processing system 370 the collected signals/data: the alarm operation is deactivated.

Upon the lapse of a visit time period, gateway 368 prompts a message to mobility 366-2, or, an audio message through speaker 362 to request user 380-2 to depart from home 308. It is also possible that gateway 368 prompts a message to user as inhabitant 380-1 mobility 366-1 requesting for extension of the elapsed visit time period.

Figure 4:
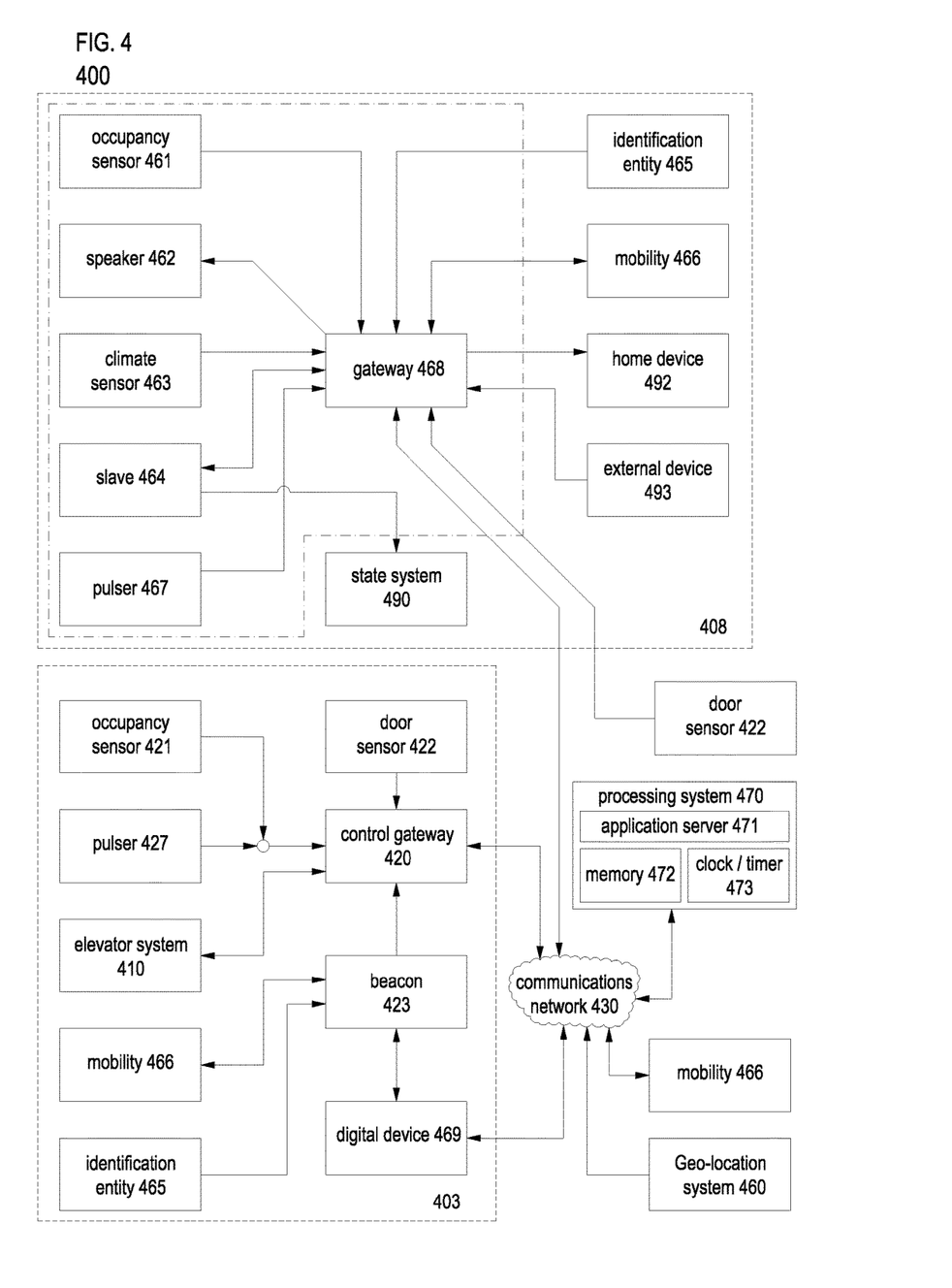
FIG. 4 depicts the infrastructure of the system.

FIG. 4 illustrates a networking schematic diagram of a preferred embodiment of the present invention system 400.

Processing system 470 may be internet accessible cloud service node located, comprising memory 472, digital processor mounted application server 471—monitoring building 403 and/or home 408 through receiving and rerouting signals/data via communications network 430. A wide variety of commercially available computer servers can be used in conjunction with appropriate software to function as processing system 470 for receiving and processing said devices sent signals/data. The wireless digital alarm data may be processed into alert information for dispersal to further receiving parties as discussed herein. An emergency entity, such as police, fire department, and/or rescue squads, may also receive alert information.

Memory 472 can be any device, including magnetic, optical or solid-state memory for storing signals/data relevant to a user or administrator of system 400. A library of predefined geo-fence boundaries, the polling interval at constant or variable frequency directing data-logging between processing system 470 with mobility 466 and digital device 469, and preconfigured thresholds comprising time periods and distances, are stored in memory 472 and retrieved by application server 471. Memory 472 can be located at a cloud service node working with or within processing system 470, or other service nodes: such as a node of home 408 or building 403; a node comprising user mobility 466, or staff digital device 469.

Geo-location system 460 is a terrestrial or satellite based positioning system; including the Beidou Navigation System, Differential GPS ("DGPS"), Eurofix DGPS, Global Positioning System ("GPS"), Global Navigation Satellite System ("GNSS"). In other positioning systems, geo-location system 460 comprises cellular communication towers, or systems providing reference points, transmit wireless radio frequency ("RF") signals/data received by user mobility 466 and staff digital device 469.

Identification entity 465 is typically an integrated circuit ("IC") card comprising a battery, memory for storing a unique identifier, and a transmitter for transmitting wireless signals comprising unique identifier to control gateway 420 and gateway 468 via a short-range wireless communication link. Typical short-range communication protocols include Bluetooth, WiFi (IEEE 802.11b), WiMax (IEEE 802.16) and ZigBee (IEEE 802.15.4).

Communications network 430 uses a combination of wireless and landline communication infrastructure such as a cellular telecommunication system and the internet, including broadband, WiMax, fixed line PSTN, etc. Communication may be established through various mediums, such as a modem, which provides a TCP/IP communication channel to processing system 470.

Communications network 430 provides two-way data-logging between processing system 470 and telematics devices; wherein, processing system 470 transmits the wireless digital alarm data in a formatted text message to a plurality of user mobilities 466, and staff digital devices 469, which may be any device capable of receiving SMS type data, or any wireless digital data, comprising digital cellular telephone, pager, personal communications systems ("PCS"), enhanced specialized mobile radios ("ESMRs"), wireless electronic mail receivers (e.g., the Blackberry® and Treo® devices), multimedia Internet enabled cellular telephones (e.g., the iPhone®), GPS receivers and similar personal electronic devices which include a programmable processor and memory, and communication transceiver capable of connecting to a wired/wireless network. In furtherance, digital device 469 also comprises a network linked electronic device with computing capacity such as a microcomputer, an internet server, a portable client device of PSTN, or a static device operative of e-mail account of the premise's owner or agent. The alarm user may receive an alert notification on mobility 466 and digital device 469. Control gateway 420 and gateway 468 are also configured for communicating with mobility 466 and digital device 469 using a short-range wireless communication protocol.

In building 403, control gateway 420 communicates with elevator system 410 via a communication link, and links with communications network 430 through a network port. Control gateway 420 encompasses a memory storing unique identifiers of the communicatively linked sensors and devices, comprising: occupancy sensor 421, door sensor 422 disposed at the normally closed entrance door of home 408, beacon 423.

Gateway 468 encompasses a memory stored unique identifier, and communication component such as a wireless module (not shown) for short-range wireless communication with mobility 466, identification entity 465, wired/wireless communication with a plurality of disparate components, comprising: door sensor 422, home device 492, and external device 493. An RJ45 or Ethernet port is possibly mounted within gateway 468 for linkage with communications network 430. A single housing (not shown) may encompass at least gateway 468, occupancy sensor 461, speaker 462, climate sensor 463, slave 464 and pulser 467.

Beacon 423 includes a short-range wireless transceiver, or an access point with wired/wireless network connectivity, comprising: a memory stored unique identifier identifiable by processing system 470; a wireless module for short-range wireless communication with a plurality of identification entities 465, mobilities 466, and digital devices 469; network port for connectivity with control gateway 420 via LAN; network port for connection to an internet connected router.

Processing system 470 receives: occupancy sensor 461 transmitted wired/wireless signals/data when detecting occupancy through gateway 468, and occupancy sensor 421 transmitted wired/wireless signals/data when detecting occupancy within building 403 through control gateway 420. In an exemplary embodiment, occupancy sensor 421 and occupancy sensor 461—comprising a communication component; a memory stored unique identifier; a passive infrared ("PIR") receiver, and/or an image capturing device for capturing images and transmitting captured images—wherein processing system 470 detects occupancy using at least one image processing method.

In one embodiment, external device 493 is a normally closed entity such as a repository, or a safe, having a memory stored unique identifier and a communication component to transmit a wired/wireless signal to gateway 468 upon open/closing. Slave 464 comprising a unique identifier is a relay with a communication component (not shown) for receiving gateway 468 sent wired/wireless signals/data, to connect and disconnect power for control of the on/off mode of state system 490, and transmit the feedback signals/data pertinent to the on/off mode of state system 490 to gateway 468.

Pulser 427 transmits pulsed wired/wireless signals/data comprising a unique identifier to processing system 470 through communications network 430. Pulser 427 may be an independent component, or a software app imbedded in gateway 468/control gateway 420.

Processing system 470 sends selected signals/data via a communication link with the control unit (not shown) of elevator system 410 to override landing and/or doors opening/closing of the serving elevators (not shown) in building 403.

Home Alarm Operation

Figure 5:
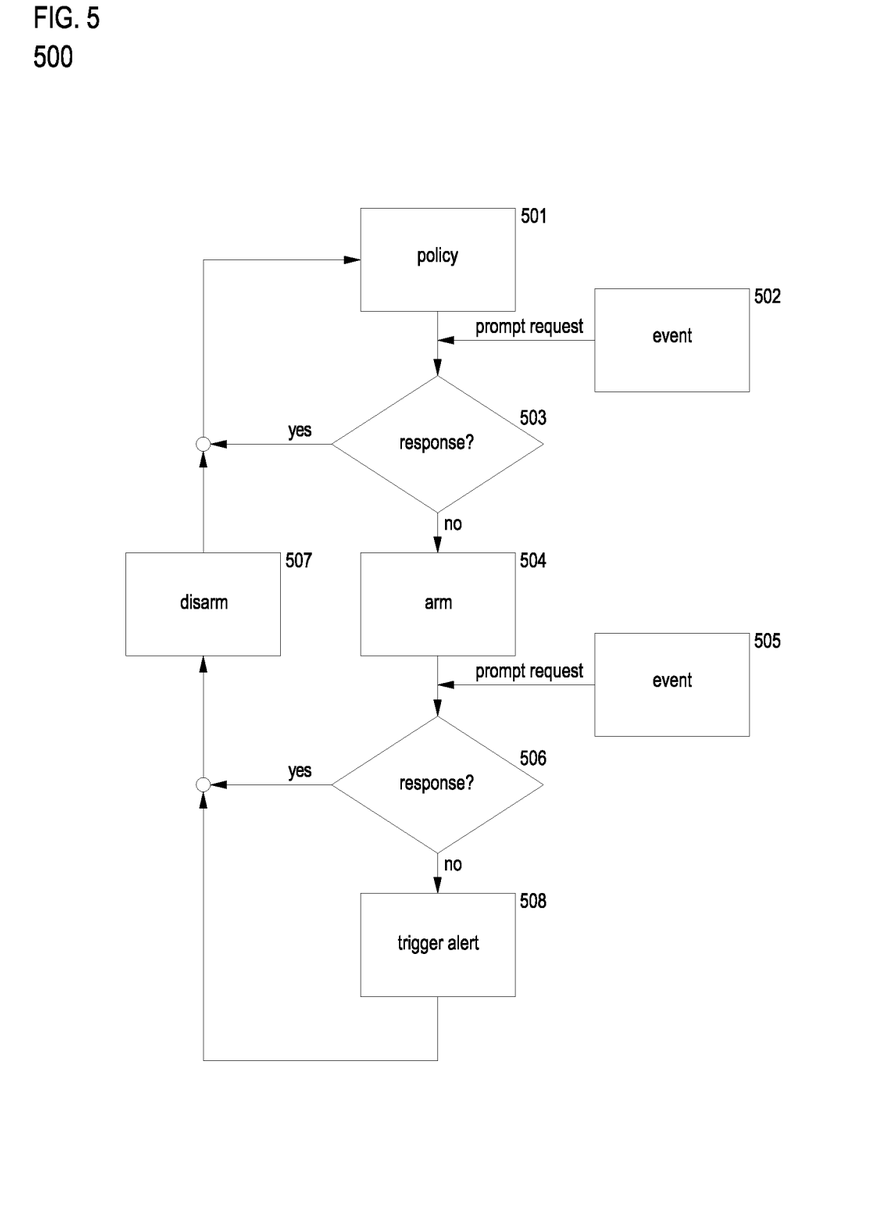
FIG. 5 is a flow chart demonstrating a method for an alarm operation.

In one aspect of the present invention, processing system 470 receives and processes signals/data sent by gateway 468, mobility 466, identification entity 465, to determine activation and deactivation of an alarm operation in compliance with an established alarm policy based on a set of criteria, to determine that an alert trigger condition is fulfilled in home 408, and to send the alert information to receiving nodes in accordance with the alert trigger process. FIG. 5 shows method 500, comprising the following steps.

Step 501: Alarm operation policy, alarm operation activation and deactivation policy, alert trigger policy are established by the administrator and stored in processing system 470 as alarm policy. Data-logging is established for interchange of signals/data transmitted and received between processing system 470 and other nodes, comprising: (1) user as inhabitant or user as visitor mobility 466 of home 408; (2) staff digital device 469; (3) gateway 468 monitoring home 408.

Step 502: Detection of a pulling event, comprising (1) door sensor 422 detecting home 408 normally closed entrance door opening/closing; (2) control gateway 420 detecting mobility 466/identification entity 465 in building 403 common use territory; (3) mobility 466 having the smallest user as inhabitant time log exceeding the preconfigured forth threshold; (4) the lapse of a visit time period.

Step 503: Gateway 468 prompts a message requesting a response message from at least one user mobility 466 upon the pulling event. If gateway 468 does not receive a user mobility 466 sent response message within a time period of the preconfigured first threshold, go to step 504; otherwise, go to step 501 for continuation of the monitoring process.

Step 504: Processing system 470 arms the system by activating an alarm operation; processing system 470 monitors home 408 through receiving gateway 468 sent signals/data pertinent to a plurality of sensors/devices, verifies concurrent or last received geo-location of user as inhabitant mobility 466, and projects a time log.

Step 505: Detection of a pushing event, comprising 1. door sensor 422 detecting home 408 normally closed entrance door opening/closing; 2. occupancy sensor 461 detecting occupancy in home 408; 3. mobility 466 having the smallest user as inhabitant time log crossing below the preconfigured forth threshold; 4. user as inhabitant authorizing extension of a lapsed visit time period through mobility 466; 5. gateway 468 detecting pairing with user as inhabitant or user as visitor mobility 466.

Step 506: Gateway 468 prompts a message requesting a response message from user mobility 466 upon the pushing event, or within a time span of the projected arrival time $t_a$ corresponding to the pertinent time log. If gateway 468 receives user as inhabitant mobility 466 sent message or, message corresponding with user as visitor mobility 466 within a visit time period, and within a time of the preconfigured first threshold, go to step 507; otherwise, go to step 508.

Step 507: Processing system 470 disarms the system by deactivating the alarm operation; go to step 501, the monitoring process continues.

Step 508: Processing system 470 performs the alert trigger process mandate for home 408 and sends the information to a receiving node, including user as inhabitant mobility 466, and/or staff digital device 469.

Building Environment Alarm Operation

Figure 6:
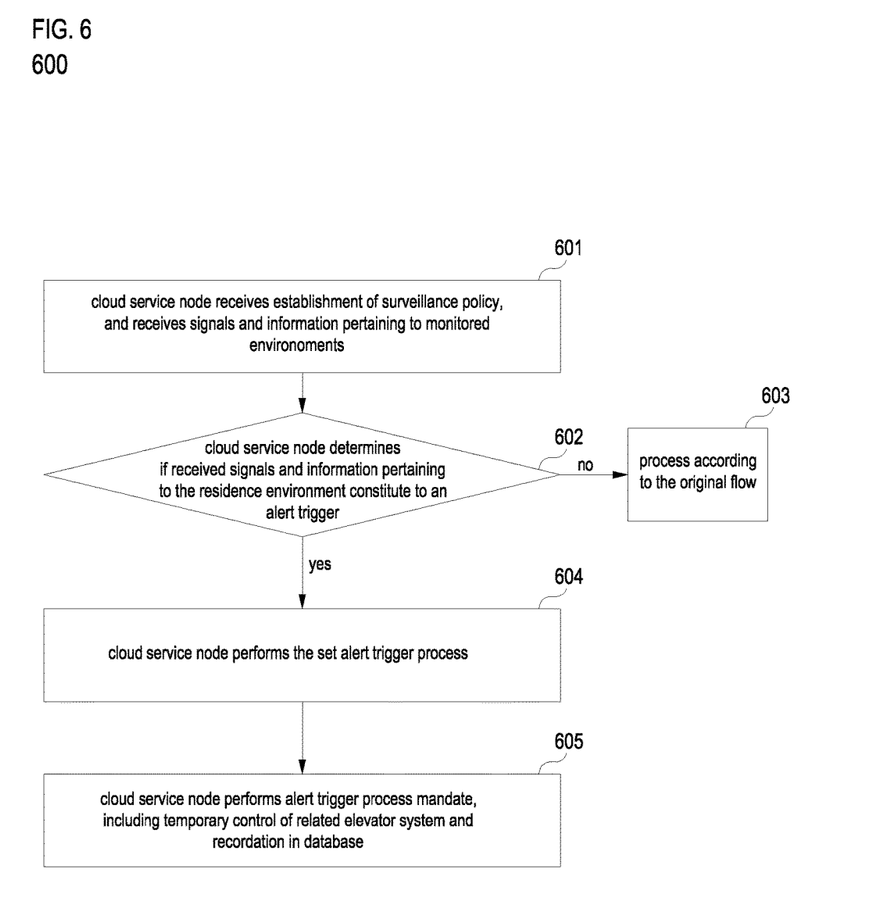
FIG. 6 is a flow chart demonstrating a method for an alarm operation in a building on basis of time based path tracking.

A method in the present invention for monitoring building 403 encompassing unit 408, comprising: processing system 470 receives signals/data sent by control gateway 420, as well as, mobility 466 and digital device 469 of users related to building 403. Processing system 470 processes the information in accordance with an established alarm policy, to determine that an alert trigger condition is fulfilled, and sends the alert to the receiving nodes in accordance with an alert trigger process. FIG. 6 shows a flowchart of method 600 for an alarm operation, comprising the following steps.

Step 601: Alarm operation policy, alert trigger policy are established by the administrator and stored in processing system 470 as alarm policy. Data-logging is established for interchange of signals/data transmitted and received between processing system 470 and other nodes, including: (1) mobility 466 carried by user as inhabitant of unit 408; (2) staff digital device 469; (3) control gateway 420 in building 403; (4) elevator system 410 operative in building 403.

Step 602: Processing system 470—tracking a user traversal path by processing signals/data sent from a plurality of occupancy sensors 421 and door sensors 422, user mobility 466 or visitor identification entity 465, and signals/data received from elevator system 410—go to step 604 if the received signals/data satisfy the set alert trigger conditions; otherwise, go to step 603 for continuation of the monitoring process.

Step 604: Processing system 470 performs the alert trigger process and sends the information to staff digital device 469, and user as inhabitant mobility 466 of a particular unit 408.

Step 605: Processing system 470 performs the alert trigger process mandate of building 403.

A. Alarm Policy Establishment:
Home 408 Alarm Policy:

User as inhabitant is authorized to set the alarm policy, enter and stay at home 408 without time constraints; user as visitor is permitted for entry and stay at home 408 with preconfigured time constraints on date and span during each visit time period. While authority limits are set by the administrator for all users; user as management staff and user as visitor are deprived of such authority.

Building 403 Alarm Policy:

The administrator establishes an alarm policy for building 403, comprising criteria of information processing procedure and priority, modification, deletion and the like. In the alarm operation process, the traversal paths pertaining to all users must comply with preconfigured time constraints in accordance with an established alarm policy.

B. Activation and Deactivation of Alarm Operation:
Home 408 Alarm Operation:

User as inhabitant may establish policy conditions; as gateway 468 received signals/data satisfy one or more of the following conditions, processing system 470 determines to activate an alarm operation in step 502.

Upon a detected pulling event, gateway 468 470 prompts a message to request response message from one or more selected user as inhabitant mobilities 466.

The alarm operation is deactivated after gateway 468 receives a response message within a time period of the preconfigured first threshold upon a pushing event, including: (1) signals/data sent by user as inhabitant mobility 466/identification entity 465; (2) signals/data sent by user as visitor mobility 466/identification entity 465, wherein the concurrent clock time is within a visit time period established by user as inhabitant, or the administrator.

Building 403 Alarm Operation:

Activation and deactivation of an alarm operation pertaining to building 403 may be performed through administrative authorization by processing system 470.

C. Alert Trigger Policy Establishment:
Home 408 Alert Trigger Conditions:

Detected occupancy at any time during an activated alarm operation, wherein aforementioned response message is not received by gateway 468 within a time period of the preconfigured first threshold.

Building 403 Alert Trigger Conditions:

The alert trigger conditions, comprising: (1) duration of detected occupancy at any particular location within building 403 exceeding the preconfigured second threshold; (2) door sensor 422 pertaining to a particular unit 408 within building 403 not detecting opening/closing, within a time period of the preconfigured third threshold; (3) staff digital device 469 pairing records not encompassing pairing with one or more beacons 423 within a preconfigured time period of a particular clock time; (4) merger of two tracked user traversal paths for entry into one unit 408 located within building 403.

Alert Trigger Policy

The alert trigger process comprises: (1) processing system 470 notifies a user via an instant communication message to mobility 466 or digital device 469; (2) notification via Email; (3) notification via an automatic telephone voice; (4) notification via a multimedia message; (5) activation of a siren; (6) recording a processed alert trigger to memory 472.

In one embodiment, alert trigger conditions are satisfied during a deactivated alarm operation, comprising: (1) door sensor 422 detecting home 408 normally closed entrance door opening/closing, external device 493—comprising a safe repository with sensor and signal transmitter—transmits a signal pertaining to opening/closing to communicatively connected gateway 468 within a time period smaller than a preconfigured fifth threshold; (2) pulser 467 configured to periodically send wired/wireless signals/data at a preconfigured frequency to gateway 468 for ascertainment of signal transmissions to processing system 470—signals/data are disrupted.

The following embodiment relates to a method comprising system 400 output to received sensor data. In FIG. 4, gateway 468 periodically collects data from climate sensor 463—a temperature sensor detecting state system 490 controlled climate attribute as indoor temperature of monitored home 408; wherein state system 490 is particularly a distinct central Heating Venting Air-Conditioning ("HVAC") system. The desired state system 490 state in a deactivated alarm operation may be a setpoint temperature of a heated or air-conditioned room, apartment, house, chosen as "comfortable" state by a user; whereas, the desired state system 490 state in an activated alarm operation is a setback temperature for energy saving. In other possibilities, climate sensor 463 can be a humidity sensor detecting indoor relative humidity, gas detector detecting carbon monoxide or other gases, smoke detector detecting smoke, multi-sensor detecting hot water temperature and volume, etc.; whereas, state system 490 is a hot water heater, humidifier, siren, energy storage of electric vehicles, etc.

During an activated alarm operation, gateway 468 compares the climate attribute data collected from climate sensor 463 with the memory stored processing system 470 sent effective setback climate attribute, or sends the collected climate attribute data to processing system 470 for determining whether it is above/below the effective setback climate attribute and receives a commanding signal: gateway 468 sends a corresponding signal to slave 464, which switches state system 490 on/off through power connection and/or disconnection. Gateway 468 retains a memory stored setback climate attribute and replaces it with a new effective setback climate attribute sent by processing system 470, which projects or calculates an effective climate attribute in accordance with the time log of at least one user as inhabitant carrying mobility 466. User may be shown the setback climate attribute through mobility 466; whereas, gateway 468 may send feedback signals/data to processing system 470 if slave 464 is triggered on.

Another embodiment comprises a method for maintaining desired state system 490 states on basis of system 400 sensor data. During an activated alarm operation at 6:00p.m., climate sensor 463 data is 16° C.; gateway 468 replaces the memory stored setback temperature 16° C. with processing system 470 sent effective setback temperature 22° C. and sends a signal to slave 464, which switches on state system 490 for an arriving user. Indoor temperature of home 408 reaches 22° C. at 6:30p.m.—the alarm operation is deactivated a few minutes afterwards while setpoint temperature 23° C. is maintained by state system 490 for the arrived user, who sends to processing system 470 via gateway 468 setpoint temperature 19° C. for a time period from 10:30p.m. to 7:00a.m.

At 10:30p.m., gateway 468 retrieves from its memory stored processing system 470 sent setpoint temperature 19° C., which is below climate sensor 463 sent temperature 23° C.; gateway 468 sends a signal to slave 464 for deactivating state system 490.

In another embodiment, comprising: (1) door sensor 422 detecting home 408 normally closed entrance door opening/closing during an activated alarm operation; (2) during certain hours of the day, gateway 468 sending a wired/wireless signal; (3) home device 492 receiving the wired/wireless signal and switches on to a setting or operative intensity in accordance with user identity before the entrance door is opened at all, or before the user is physically or visually exposed to any home 408 territory. As one possibility, home device 492 is a light fixture brightened to yield a scene characterized for an incoming user identified through the projected arrival time $t_a$. Alternatively, gateway 468 sends a signal to home device 492 as long as the clock time is within a certain time span of the day, regardless of the alarm operation status.

One with ordinary skill in the art will agree that the embodiments presented herein are merely exemplary, therefore aspects of those embodiments may vary without departing from the spirit and scope of the invention, which is defined in the claims.

The invention claimed is:

1. A method of monitoring conditions in a space, comprising:
   establishing a communication link between a network connected monitoring device and one or more user mobile devices through communicative pairing;
   receiving one or more user mobile devices and user identification entities signals through the monitoring device;
   receiving user mobile device pairing records comprising pairing and pairing disconnection with the monitoring device, and a corresponding user mobile device unique identifier;
   receiving user mobile device pairing records comprising pairing and pairing disconnection with a beacon disposed at a location, and a corresponding beacon unique identifier;
   recording the pairing records in a memory;
   activating/deactivating an alarm operation;
   triggering an alert;
   wherein a processing system includes detecting a pulling event during a deactivated alarm operation that comprises at least one of:
      (i) detecting a user mobile device or user identification entity at a location through a beacon, after detecting opening/closing of a normally closed door disposed at a shortest distance from the monitoring device; or,
      (ii) detecting the lapse of a visit time period with respect to the concurrent time; or,
      (iii) receiving user mobile device sent pairing records comprising pairing disconnection with the monitoring device; or,
      (iv) detecting a smallest user time log, among a plurality of user time logs of users as inhabitants, exceeding a preconfigured threshold;
   generating a state signal;
   transmitting the state signal to a user as inhabitant mobile device, when requesting authorization to resume a lapsed visit time period;
   transmitting the state signal to the monitoring device.

2. The method of claim 1, wherein the monitoring device detecting step includes a pulling event during a deactivated alarm operation, that comprises at least one of:
   (i) receiving the state signal; or,
   (ii) detecting opening/closing of the normally closed door; or,
   (iii) detecting pairing disconnection with a user mobile device; or,
   (iv) detecting the lapse of a visit time period with respect to the concurrent time;
   generating a secondary state signal;
   transmitting the secondary state signal to a selected user mobile device.

3. The method according to claim 1, further comprising:
   receiving the secondary state signal;
   generating an arming signal for the secondary state signal;
   activating an alarm operation;
   transmitting the arming signal to the monitoring device.

4. The method according to claim 2, wherein the monitoring device, further comprising:
   generating an overriding signal for the arming signal;
   transmitting the overriding signal to:
   (a) an activated electrical device receiving the overriding signal and deactivating within a preconfigured time period, or, a deactivated electrical device receiving the overriding signal and activating within a preconfigured time period; and/or, (b) an electric door lock receiving the overriding signal remains in the locked state precluding being unlocked; and/or, (c) a relay slave receiving the overriding signal and deactivating an activated power connected system within a preconfigured time period, or, receiving the overriding signal and activating a deactivated power connected system within a preconfigured time period.

5. The method of claim 1, wherein the processing system detecting a pushing event during an activated alarm operation, comprising:

receiving a user as inhabitant mobile device sent message authorizing to resume a lapsed visit time period; or, receiving user mobile device sent pairing records comprising pairing with the monitoring device; or, detecting a smallest user time log, among a plurality of user time logs of users as inhabitants, crossing below a preconfigured threshold, and transmitting said smallest user time log, comprising the corresponding projected user arrival time to the monitoring device.

6. The method of claim 5, wherein the monitoring device detecting a pushing event during an activated alarm operation, comprises:

detecting occupancy; or, detecting opening/closing of a normally closed door;

detecting pairing with a user mobile device;

generating a returning signal; transmitting the returning signal to the user mobile device.

7. The method according to claim 6, wherein the processing system deactivating an alarm operation, comprises:

receiving the returning signal; deactivating the alarm operation.

8. The method according to claim 6, further comprising:

transmitting the returning signal upon detecting the normally closed door opening/closing, in a selected time period of the day, wherein within a time span from the user time log comprised projected user arrival time or an effective visit time period, to:

(a) a deactivated electrical device, wherein receiving the returning signal and activating; and/or, (b) an electric door lock, wherein receiving the returning signal and switches to a locked/unlocked state allowing being unlocked; and/or, (c) a relay slave, wherein receiving the returning signal and activating a power connected deactivated system within a preconfigured time period.

9. The method of triggering an alert during an activated alarm operation according to claim 6, comprising:

the monitoring device detecting occupancy, or opening/closing of the normally closed door, not receiving a response message within a preconfigured time period from a user as inhabitant mobile device or a user as visitor mobile device, wherein a concurrent visit time period is in effect and the monitoring device not concurrently paired with a user as inhabitant mobile device or a user as visitor mobile device;

the monitoring device detecting occupancy, or pairing with a user as visitor mobile device, not receiving a response message within the preconfigured time period from a user as inhabitant mobile device, or, the processing system not receiving a user as inhabitant mobile device sent message authorizing to resume a lapsed visit time period within a preconfigured time period, wherein a concurrent visit time period is not in effect;

the monitoring device detecting opening/closing of the normally closed door, not concurrently paired with a user as inhabitant mobile device or a user as visitor mobile device, not receiving a response message within the preconfigured time period from a user as inhabitant mobile device, wherein a concurrent visit time period is not in effect; or, the monitoring device detecting occupancy, or opening/closing of the normally closed door, not concurrently paired with a user as visitor mobile device, wherein a smallest user time log, among a plurality of user time logs of users as inhabitants, exceeded the preconfigured threshold, and a concurrent visit time period is not in effect;

the monitoring device generating a secondary state signal and sending it to the processing system;

the processing system triggering an alert.

10. The method of claim 1, wherein the user time log, further comprises:

the geo-location data of user as inhabitant; or, the address of a location; or, the projected user arrival time at the monitoring device disposed space;

the projected user arrival time comprising the lead time duration pertinent to a user as inhabitant, including: obtaining the unique identifier of a beacon disposed at a location; or, recording user mobile device pairing records comprising pairing and pairing disconnection with a beacon; or, providing questions to a user about the location;

obtaining user provided answers to the questions in text and/or voice; or, deriving at least one pattern related to at least one characteristic of the location, wherein said at least one characteristic including the geo-location and user activity, and, projecting a typical/average time of stay of the user as inhabitant at the location.

11. A method of monitoring conditions by a processing system in a building related to a plurality of users, including at least at least one staff and at least one visitor, comprising:

establishing a communication link with one or more user mobile devices, staff digital devices through communicative pairing;

activating and deactivating an alarm operation in accordance with administrative authorization;

receiving from staff digital device pairing records comprising pairing and pairing disconnection with a plurality of beacons disposed at a location, and corresponding unique identifiers;

receiving from user mobile digital device pairing records comprising pairing and pairing disconnection with at least one monitoring device and one or more beacons disposed at a plurality of locations, and the corresponding unique identifiers;

triggering an alert in accordance with user as staff digital device pairing records not including pairing with one or more distinct beacons within a preconfigured time period, or preconfigured time period since receiving an alert message; or, triggering an alert in accordance with a detected event during an activated alarm operation;

generating an activity signal corresponding to an entity, including:

(a). a normally closed door disposed with a door sensor detecting opening/closing;

(b). an elevator door disposed on a landing floor corresponding to a landing elevator car;

(c) an occupancy sensor detecting occupancy;

generating a secondary activity signal for a selected activity signal corresponding to detected occupancy in a building territory;

recording the secondary activity signal and defining the concurrent time as the reporting time;

counting a maneuvering time duration commencing from the reporting time to the time of an activity signal corresponding to an entity disposed at a shortest distance from the occupancy sensor pertinent to said secondary activity signal;

triggering an alert in accordance with a maneuvering time duration exceeding the preconfigured time period, wherein the occupancy sensor pertinent to the secondary activity signal, comprising:

(a) disposed not at a shortest distance from a door, an elevator door, or a parking garage exit; or, (b) disposed at a shortest distance from a door or an elevator door without a corresponding activity signal; or, (c) disposed at a shortest distance from an elevator door with a corresponding activity signal for an elevator car landed on the floor level of said building territory departing without passenger boarding the elevator car.

12. A system for implementing the method according to claim 1, further comprising:

at least one monitoring device disposed in a space;

one or more beacons disposed at a location; a processing system communicatively linked with at least one monitoring device;

the processing system communicatively linked with one or more beacons.

13. The system according to claim 12, wherein the monitoring device further comprises:

a wireless module enabling signals/data transport through a short-range wireless communication link with at least one user identification entity, at least one user mobile device, at least one door sensor, at least one electrical device;

an interface for receiving sensor signals/data;

an RJ45 or other wired or wireless Ethernet interface for linkage with a network, including the PSTN, LAN, and the internet;

an occupancy sensor generating a signal upon detecting occupancy;

one or more climate sensors including a digital temperature sensing module or a thermistor, or, a gas sensor, or, a hot water temperature sensor, or a hot water volume sensor, or, a humidity sensor, or, a smoke sensor, collecting indoor climate attribute data comprising: the indoor temperature, or, concentration of a gas in air, or, hot water temperature, or, hot water volume, or, relative humidity, or, concentration of combustion particulates in air;

a processing module for processing data;

a memory for storing data.

14. The system according to claim 13, wherein the monitoring device is configured to:

pair with one or more user mobile devices through a short-range wireless communication link;

receive signals/data sent from said one or more user mobile devices;

send to the processing system signals/data collected from sensors, and user mobile devices.

15. The system according to claim 14, wherein the user mobile device is configured to:

pair with the monitoring device and establish a short-range wireless communication link;

receive signals/data sent from the monitoring device; or, pair with a beacon disposed at a location, comprising a building or a vehicle;

receive signals/data sent from the processing system through the network;

send geo-location data to the processing system in accordance with a preconfigured frequency;

send the pairing records to the processing system;

provide questions to a user about a location disposed with at least one beacon comprising a unique identifier;

receive user provided answers to the questions;

analyze the data and said answers to obtain a user time log;

send the user time log to the processing system.

16. The system according to claim 12 comprising:

at least one application server having computing and data processing capability, connected to the network with the process and software that allows interactive processing of information receiving from one or more of the user mobile devices, staff digital devices, monitoring devices, and beacons;

a memory working with or within the application server for storing data, pairing records and other information;

a clock/timer providing the clock time to the monitoring device, user mobile device and staff digital device;

receiving signals/data sent from sensors, or at least one of a relay slave, and user mobile devices, through the monitoring device;

receiving user mobile devices sent data, comprising any one or combination of the geo-location data, user time log and pairing records;

receiving data collected from one or more beacons disposed at a location; providing questions to a user about the location;

receiving user provided answers to the questions;

analyzing the data and answers to obtain a user time log;

storing the monitoring device sent signals/data in the memory;

storing in the memory user as inhabitant mobile device sent information, including the user time log;

receiving user as visitor mobile device sent information, including the response message;

storing in the memory one or more preconfigured thresholds pertinent to the user time log;

storing in the memory a plurality of preconfigured thresholds comprising multiple number of time periods;

storing in the memory one or more user as inhabitant defined visit time periods pertinent to a communicatively linked monitoring device.

17. The method according to claim 1 further comprising receiving and processing user mobile device sent user time log or geo-location data.

18. The method according to claim 1 wherein the pairing records comprising pairing and pairing disconnection are recorded with respect to time.

19. The method according to claim 2 further comprising the monitoring device transmitting the secondary state signal to the processing system, wherein a concurrent visit time period is in effect and not receiving a response message within a preconfigured time period from the selected user mobile device; or, a concurrent visit time period is not in effect and not receiving a response message within a preconfigured time period from the selected user mobile device.

20. The method according to claim 6 further comprising the monitoring device transmitting the returning signal to the processing system, wherein a concurrent visit time period is in effect and receiving a response message within a preconfigured time period from a user as inhabitant mobile device, or, a user as visitor mobile device; or, a concurrent visit time period is not in effect and receiving a response message within a preconfigured time period from a user as inhabitant mobile device.

\* \* \* \* \*